United States Patent
Copner et al.

[19]

[11] Patent Number: 6,125,220
[45] Date of Patent: Sep. 26, 2000

[54] INTERFEROMETRIC OPTICAL DEVICE INCLUDING A RESONANT OPTICAL CAVITY

[76] Inventors: Nigel Copner, 2184 Carsonby Road West, North Gower, Ontario, Canada, K0A 2T0; Paul Colbourne, 45D Woodfield Drive, Nepean, Ontario, Canada, K2G 3Y6; Joshua B. J. Philipson, No. 3-128 Flora Street, Ottawa, Ontario, Canada, K1R 5R5

[21] Appl. No.: 09/275,962

[22] Filed: Mar. 25, 1999

[30] Foreign Application Priority Data

Dec. 23, 1998 [CA] Canada ................................. 2256963

[51] Int. Cl.[7] .................................................. G02B 6/26
[52] U.S. Cl. .................. 385/27; 359/118; 372/6
[58] Field of Search ............................ 385/27, 31, 32, 385/33, 34, 39, 47, 24, 48, 73; 359/118, 92–94, 127; 372/6, 12; 356/352

[56] References Cited

U.S. PATENT DOCUMENTS

| | | | |
|---|---|---|---|
| 4,680,767 | 7/1987 | Hakimi et al. | 372/6 |
| 4,813,756 | 3/1989 | Frenkel et al. | 385/73 |
| 5,140,651 | 8/1992 | Soref et al. | 385/2 |
| 5,283,845 | 2/1994 | Ip | 385/24 |
| 5,647,036 | 7/1997 | Deacon et al. | 385/27 |
| 5,682,447 | 10/1997 | Kuzyk et al. | 385/13 |
| 5,724,463 | 3/1998 | Deacon et al. | 385/27 |

OTHER PUBLICATIONS

"Realizing of OADM using FP resonator as both dropping and bypass device" H. Naigqian, C. Zhangyuan, X. Anshi, X. Linzhen Conference on Optical Fiber Communication, Jul. 1998, vol. 3420, pp. 265–272.

Benjamin B. Dingel and Masayuki Izutsu, "Multifunction optical filter with a Michelson–Gires–Tournois interferometer for wavelength–division–multiplexed network system applications," Optical Society of America, 1998, 3 pp.

*Primary Examiner*—Akm E. Ullah
*Attorney, Agent, or Firm*—Neil Teitelbaum & Associates

[57] ABSTRACT

A method and circuit is disclosed wherein two beams exiting opposite ends of a resonant optical cavity, such as a Fabry-Pérôt (FP) etalon for example, are provided via waveguides or via free space directed by mirrors to a combining region where the beams can interfere with one another to provide a desired output response. In one embodiment, multiplexed channels of light can be demultiplexed by the device described heretofore, or alternatively, the phase relationship between these two beams can be altered prior to their being combined to provide, for example, a linearized output response useful in applications such as wavelength locking. By varying the reflectivity of the optical cavity reflectors and/or by varying the phase relationship between the two beams exiting the optical cavity, a variety of desired output responses can be realized.

23 Claims, 10 Drawing Sheets

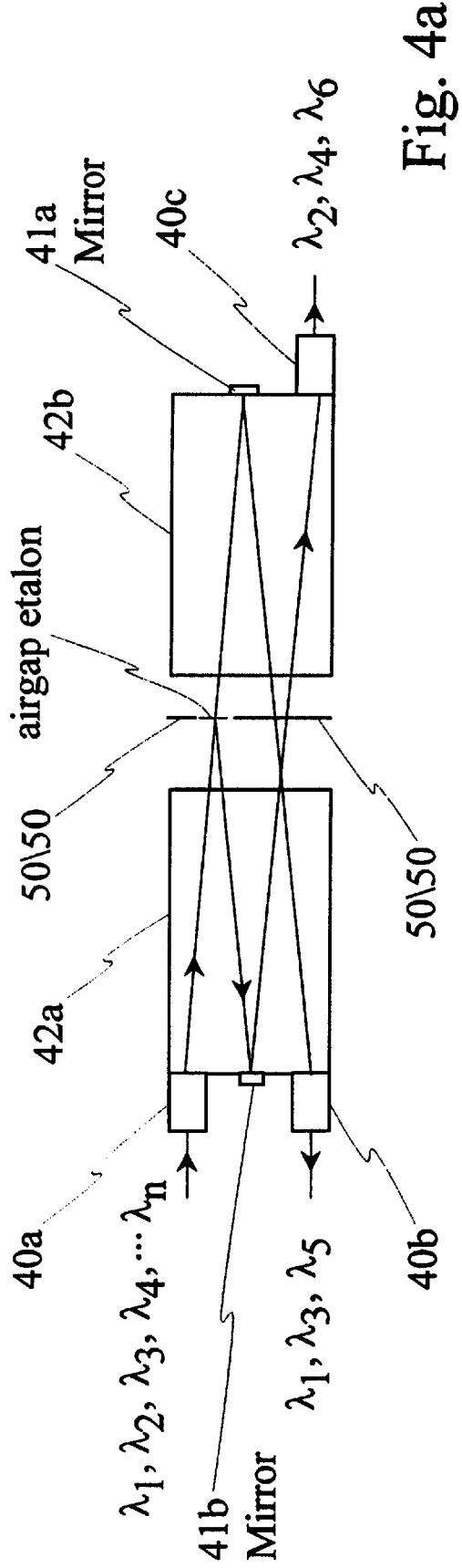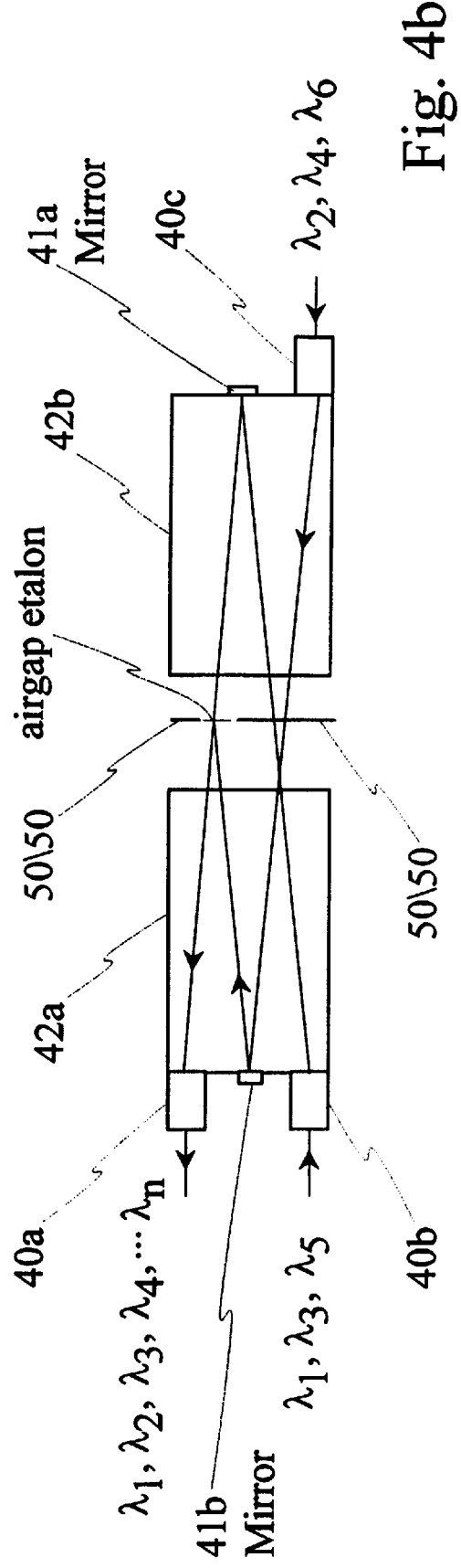
Fig. 4a
Fig. 4b

INTERFEROMETRIC OPTICAL DEVICE INCLUDING A RESONANT OPTICAL CAVITY

FIELD OF THE INVENTION

This invention relates to generally to a multi-port optical cavity and more particularly to an optical cavity having at least three-ports and use thereof.

BACKGROUND OF THE INVENTION

Using optical signals as a means of carrying channeled information at high speeds through an optical path such as an optical waveguide i.e. optical fibres, is preferable over other schemes such as those using microwave links, coaxial cables, and twisted copper wires, since in the former, propagation loss is lower, and optical systems are immune to Electro-Magnetic Interference (EMI), and have higher channel capacities. High-speed optical systems have signaling rates of several mega-bits per second to several tens of giga-bits per second.

Optical communication systems are nearly ubiquitous in communication networks. The expression herein "Optical communication system" relates to any system that uses optical signals at any wavelength to convey information between two points through any optical path. Optical communication systems are described for example, in Gower, Ed. Optical communication Systems, (Prentice Hall, N.Y.) 1993, and by P. E. Green, Jr in "Fiber optic networks" (Prentice Hall N.J.) 1993, which are incorporated herein by reference.

As communication capacity is further increased to transmit an ever-increasing amount of information on optical fibres, data transmission rates increase and available bandwidth becomes a scarce resource.

High speed data signals are plural signals that are formed by the aggregation (or multiplexing) of several data streams to share a transmission medium for transmitting data to a distant location. Wavelength Division Multiplexing (WDM) is commonly used in optical communications systems as means to more efficiently use available resources. In WDM each high-speed data channel transmits its information at a pre-allocated wavelength on a single optical waveguide. At a receiver end, channels of different wavelengths are generally separated by narrow band filters and then detected or used for further processing. In practice, the number of channels that can be carried by a single optical waveguide in a WDM system is limited by crosstalk, narrow operating bandwidth of optical amplifiers and/or optical fiber non-linearities. Moreover such systems require an accurate band selection, stable tunable lasers or filters, and spectral purity that increase the cost of WDM systems and add to their complexity. This invention relates to a method and system for filtering or separating closely spaced channels that would otherwise not be suitably filtered by conventional optical filters.

Currently, internationally agreed upon channel spacing for high-speed optical transmission systems, is 100 Ghz, equivalent to 0.8 nm, surpassing, for example 200 Ghz channel spacing equivalent to 1.6 nanometers between adjacent channels. Of course, as the separation in wavelength between adjacent channels decreases, the requirement for more precise demultiplexing circuitry capable of ultra-narrow-band filtering, absent crosstalk, increases. The use of conventional dichroic filters to separate channels spaced by 0.4 nm or less without crosstalk, is not practicable; such filters being difficult if not impossible to manufacture.

In a paper entitled Multifunction optical filter with a Michelson-Gires-Turnois interferometer for wavelength-division-multiplexed network system applications, by Benjamin B. Dingle and Masayuki Izutsu published 1998, by the Optical Society of America, a device hereafter termed the GT device provides some of the functionality provided by the instant invention. For example, the GT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12$r$ and a front reflector 12$f$ having a reflectivity of about 10%; hence an output signal from only the front reflector 12$f$ is utilized. A beam splitting prism (BSP) 18 is disposed to receive an incident beam and to direct the incident beam to the etalon 10. The BSP 18 further receives light returning from the etalon and provides a portion of that light to the plane mirror 16 and a remaining portion to an output port. Although the GT device appears to perform its intended function, it appears to have certain limitations: As opposed to the device of the instant invention which has a phase difference between transmitted and reflected E-fields of 0 and $\pi$ radians, the GT as can be seen in the graph of FIG. 1$b$ has some variation in phase between 0 and $\pi$ radians. Furthermore, in the GT device a finite optical path difference is required in the interferometer to produce an output response that mimics the one provided by the device of the instant invention. Typically for a 50 GHz free spectral range (FSR) this optical path difference would be a few millimeters; in contrast in the instant invention the optical phase difference need only be approximately $\lambda/4$ resulting in a more temperature stable and insensitive system. One further limitation of the GT device is its apparent requirement in the stabilization of both the etalon and the interferometer. Yet a further drawback to the GT device is the requirement for an optical circulator to extract the output signal adding to signals loss and increased cost of the device; and the requirement of a BSP which is known to have a significant polarization dependent loss. FIG. 1$a$ shows a graph with a linear plot of the phase difference between the two reflected E-fields from the GT and a mirror with an optical path difference. Further, the graph shows a linear plot of phase variation of reflected light from the GT. A reflection profile is also shown in a logarithmic plot, and a straight sloped dotted line is a linear plot of a GT with a finite optical path difference.

It is an object of this invention to provide a method and circuit for separating an optical signal having closely spaced channels into at least two optical signals wherein channel spacing between adjacent channels is greater in each of the at least two optical signals, thereby requiring less precise filters to demultiplex channels carried by each of the at least two signals.

The present invention is believed to overcome many of the limitation of the prior art GT device and of other known multiplexing and demultiplexing devices.

It is an object of this invention to provide a relatively inexpensive optical circuit for interleaving or de-interleaving optical channels.

It is an object of this invention to provide an etalon based device wherein output signals from two oppositely disposed ports can be controllably interferometrically combined to yield a desired output response.

SUMMARY OF THE INVENTION

In accordance with the invention, a filtering device is provided comprising a resonant optical cavity having a first and a second partially transmissive reflector. The resonant optical cavity has an input port and two output ports. A first of the two output ports are disposed at the first partially transmissive reflector and a second of the output ports is disposed at the second partially transmissive reflector. The filtering device also includes a component for combining light beams exiting the first and second output ports so that they interfere to provide one or more output beams of light. The spacing between the first and second partially transmissive reflector is 5λ or more.

In accordance with the invention there is provided, a filtering device comprising:

a resonant optical cavity having a first and a second partially transmissive reflector, said resonant optical cavity having an input port and two output ports, a first of the two output ports being disposed at the first partially transmissive reflector and a second of the output ports being disposed at the second partially transmissive reflector;

a phase shifter for controllably varying the phase relationship between two light beams exiting the first and second output ports and, means for combining light beams exiting one the first and second output ports and the phase shifter so that they interfere to provide one or more output beams of light.

In accordance with another aspect of the invention a method of filtering an input beam of light comprising multiplexed channels of light each occupying a predetermined wavelength band is provided comprising the steps of:

providing the input beam to a resonant optical cavity;

capturing a first output beam from a first end face of the resonant optical cavity;

capturing a second output beam from a second end face of the resonant optical cavity; and, combining the two captured beams so that they interfere with one another to produce one or more filtered output beams.

In accordance with yet another aspect of the invention, a method of providing a linearized intensity variation with wavelength comprises the steps of:

providing the input beam to a resonant optical cavity;

capturing a first output beam from a first end face of the resonant optical cavity;

capturing a second output beam from a second end face of the resonant optical cavity; and, combining the two captured beams so that they interfere with one another to produce one or more filtered output beams.

BRIEF DESCRIPTION OF THE DRAWINGS

Exemplary embodiments of the invention will now be described in conjunction with the drawings in which:

FIG. 4a is a circuit block diagram of an alternative embodiment of the structure shown in FIG. 2, wherein two light transmissive blocks are utilized as combining regions;

FIG. 4b is a circuit block diagram similar to the one shown in FIG. 4a, wherein the circuit is operated in a reverse mode of operation;

DETAILED DESCRIPTION

In general, the spectral characteristics of an etalon filter are determined by the reflectivity and gap spacing of the mirrors or reflective surfaces. The Fabry-Perôt principle allows a wideband optical beam to be filtered whereby only periodic spectral passbands are substantially transmitted out of the filter. Conversely, if the reflectivity of the mirrors or reflective surfaces are selected appropriately, periodic spectral passbands shifted by d nanometers are substantially reflected backwards from the input mirror surface. In adjustable Fabry-Perôt devices, such as one disclosed in U.S. Pat. No. 5,283,845 in the name of Ip, assigned to JDS Fitel Inc, tuning of the center wavelength of the spectral passband is achieved typically by varying the effective cavity length (spacing).

Figure 1:
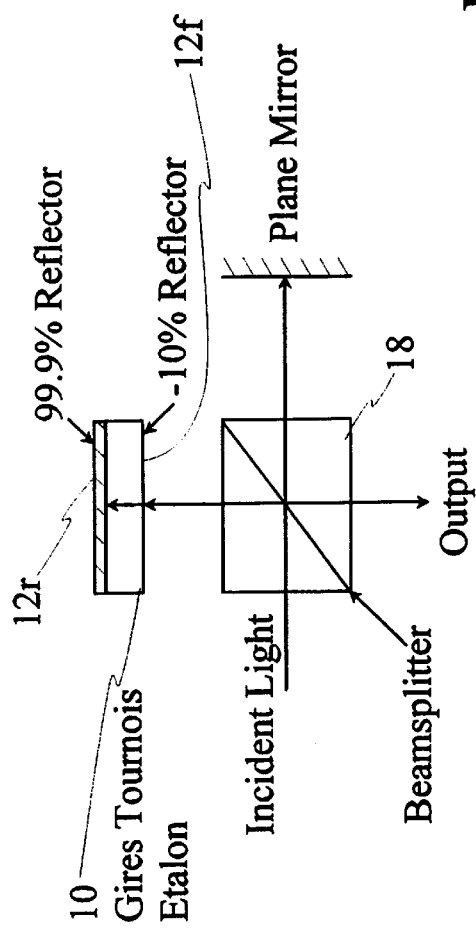
FIG. 1 is a circuit block diagram of a prior art Michelson-Gires-Tournois interferometer.
Figure 2A:
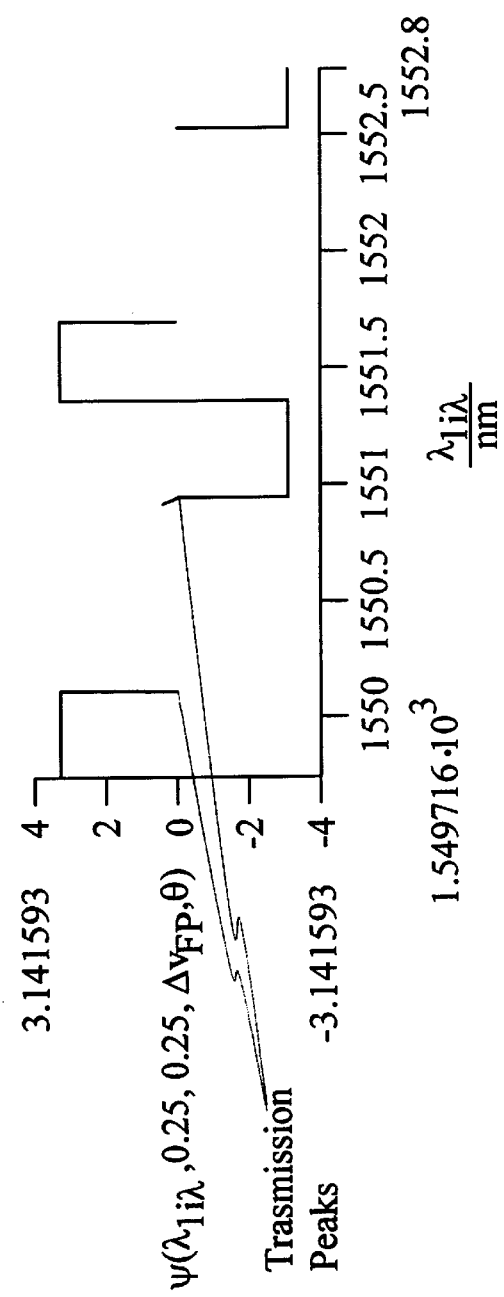
FIG. 2a is a graph plotting phase versus wavelength for a two output etalon in accordance with this invention.
Figure 1A:
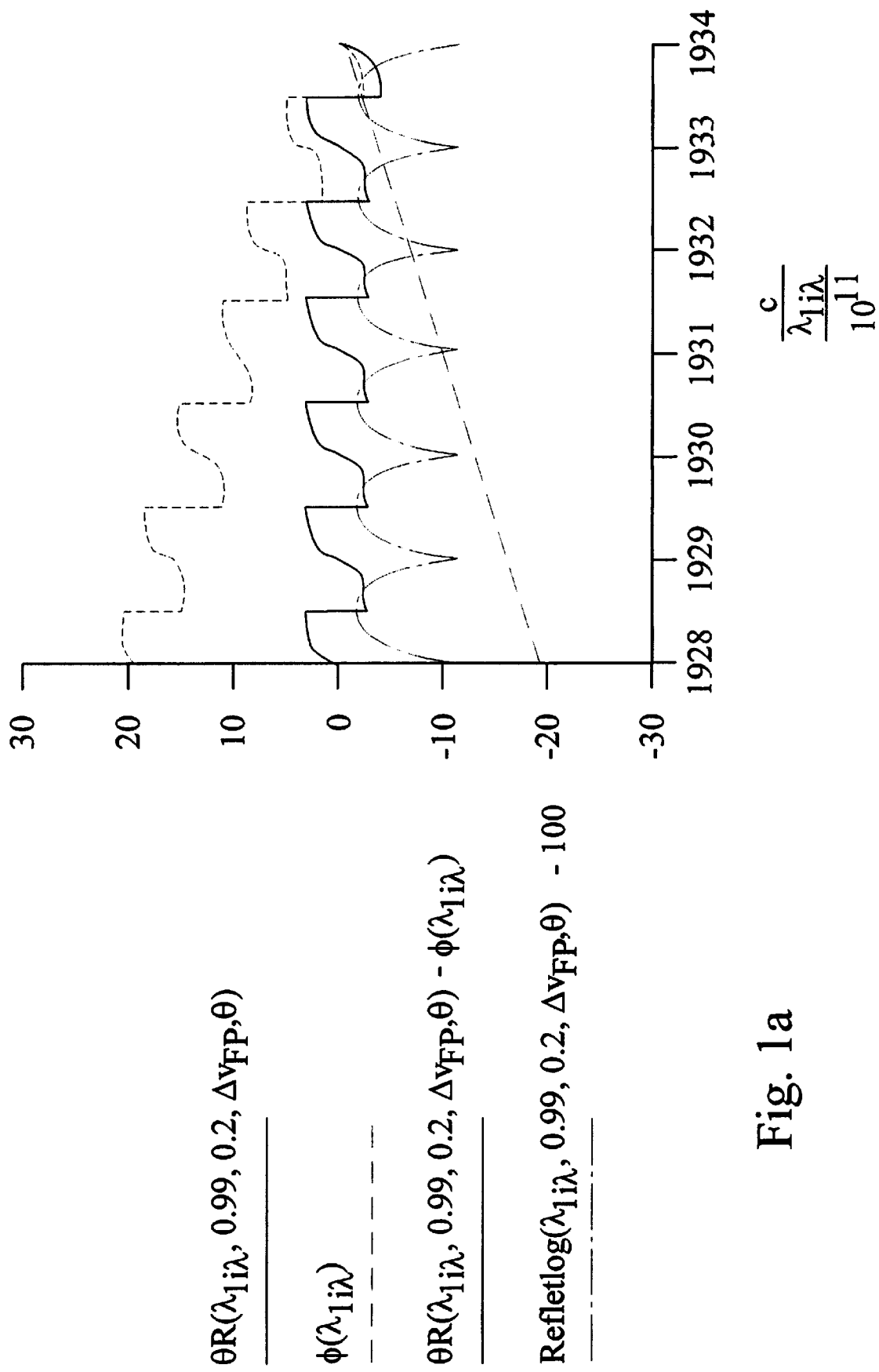
FIG. 1a is logarithmic graph plotting phase versus wavelength for a two output Michelson-Gires-Tournois interferometer.
Figure 1B:
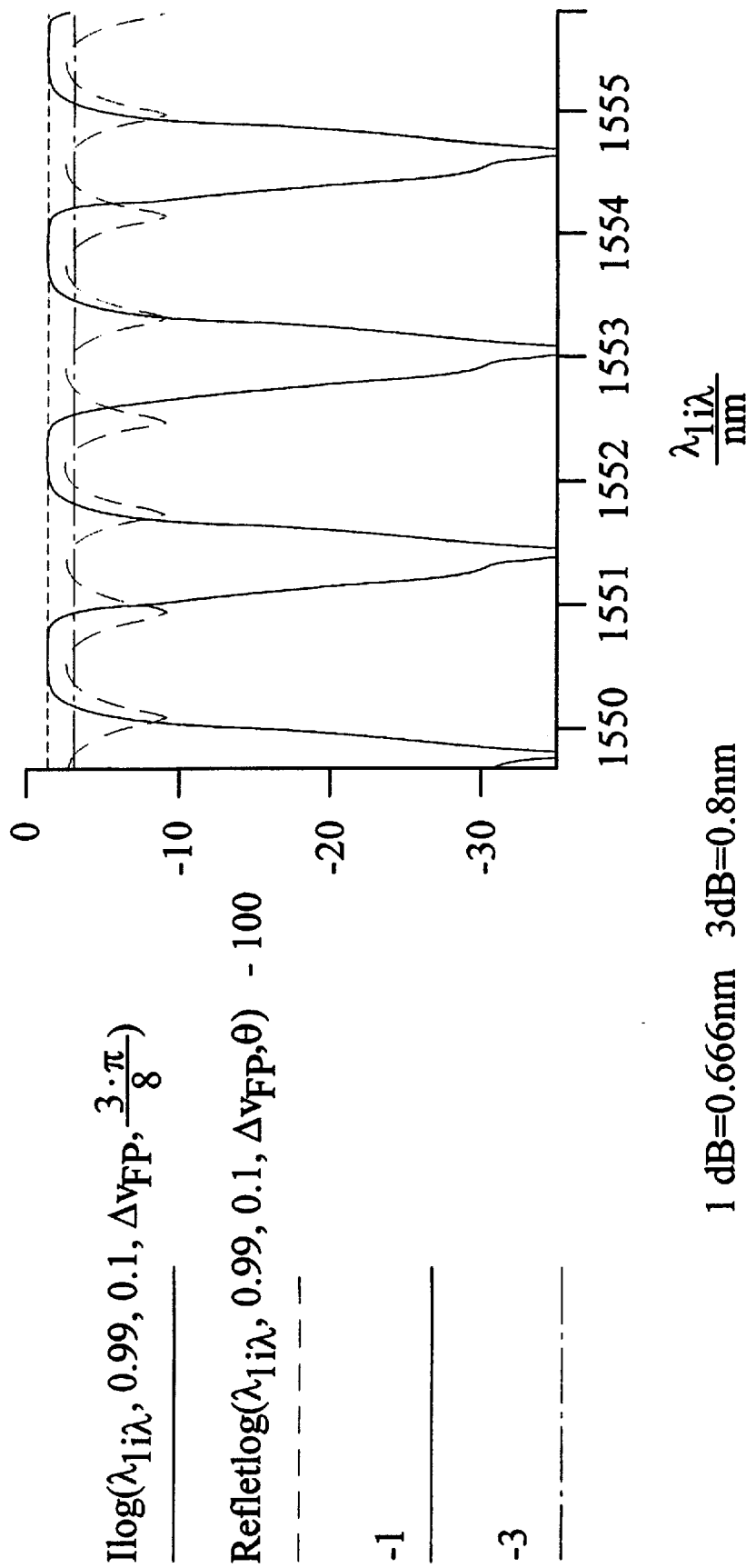
FIG. 1b is a graph of a simulated output response of a Michelson-Gires-Tournois interferometer.
Figure 2:
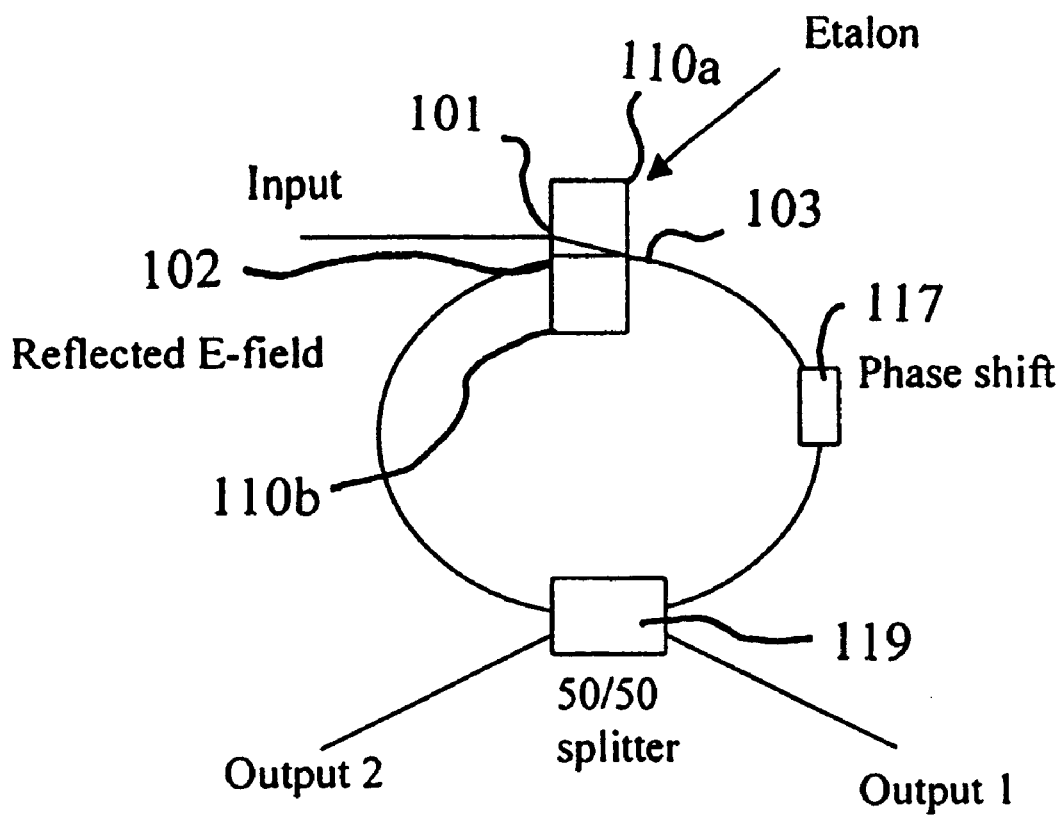
FIG. 2 is a circuit block diagram of a single etalon interferometric structure in accordance with the invention.

Referring now to FIG. 2, an optical circuit is shown for demultiplexing a channeled optical signal, that is, a signal comprising multiplexed closely spaced channels, into a plurality of less-dense channeled signals each comprising a plurality of multiplexed less closely spaced channels. Operating the circuit in a first direction wherein the circuit performs a multiplexing function on a plurality of channels launched into an end of the circuit, it is an interleaver circuit, and in an opposite direction wherein the circuit performs a demultiplexing function on a composite signal launched therein at an opposite end to provide a plurality of demultiplexed channels it serves as a de-interleaver circuit. However, the term interleaver circuit shall be used hereafter to denote this interleaver/de-interleaver circuit. One such interleaver circuit is disclosed as a comb splitting filter in U.S. Pat. No. 5,680,490 in the name of Cohen.

Figure 3:
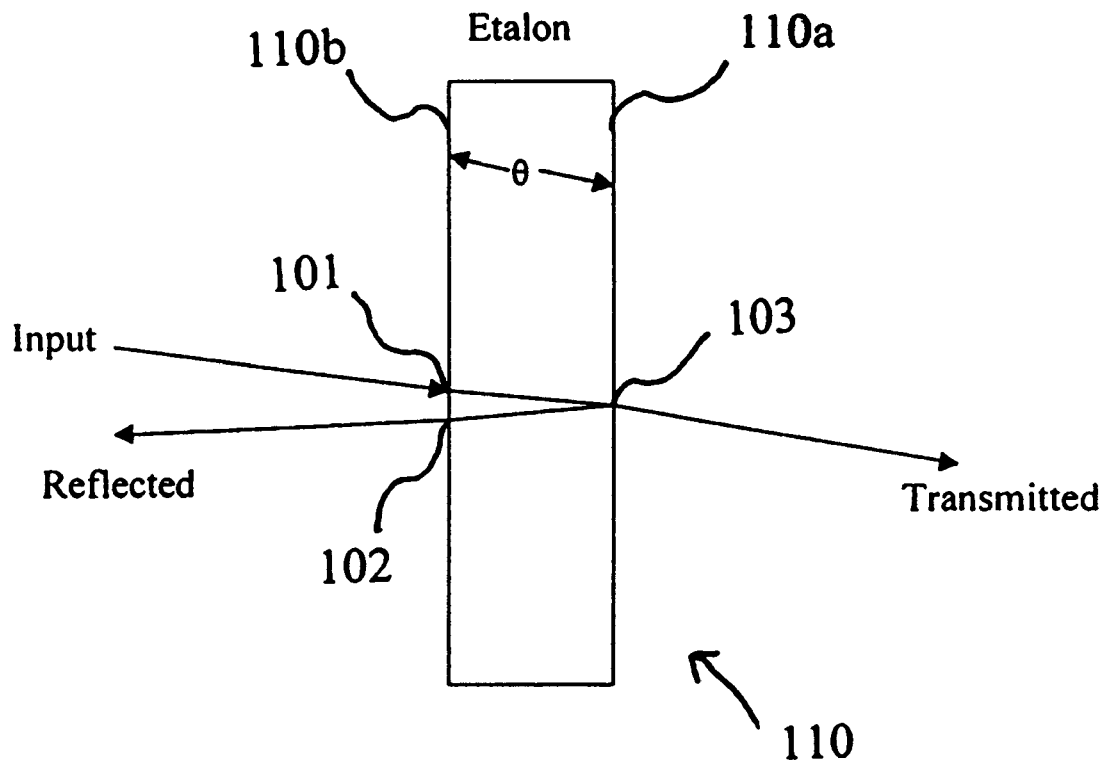
FIG. 3 is a more detailed diagram of the etalon shown in FIG. 2 in accordance with the invention.

Referring now to FIGS. 2, an optical interleaver circuit is shown including a 3-port optical cavity in the form of a Fabry-Perôt etalon filter 110 (shown in more detail in FIG. 3) having a first partially reflective end face 110a and a second partially reflective end face 110b. The Fabry-Perôt etalon has an input port 101 at end face 110b, a second port 102 at the Fabry-Perôt etalon filter reflection end face 110, and a third port 103 coupled to a transmission end face 110a serving as an output port. The Fabry-Perôt etalon filter 110 has two partially reflective mirrors, or surfaces, facing each other and separated by a certain fixed gap which forms a cavity.

A phase shifter for controllably delaying an optical signal passing therethrough is optically coupled with the third port 103 at an end of the Fabry-Perôt etalon 110. A 50/50 splitter 119 is disposed between and optically coupled with an output end of the phase shifter 117 and the second port 102 of the Fabry-Perôt etalon 110. Although shown schematically as having waveguides, for example, optical fibres for directing signals from the etalon to the phase shifter 117 and splitter 119, less preferable free space implementations using mirrors or reflectors are within the capability of one skilled in the art. Of course coupling lenses (not shown) such as GRIN lenses are preferred for coupling light from and or to optical fibres from particular components.

The inventor has recently noticed that a phase difference between the reflected and transmitted E-field phase from an etalon, for example, the etalon 110, remains constant under certain circumstances. Furthermore, when input light is launched into the input port 101 of the etalon, the phase difference between the a resulting signal exiting the end face 103 and a resulting signal exiting the end face 102 is either 0 or $\pi$ radians, and changes on every spectral transmission resonance. This is illustrated in FIG. 2a, where phase is plotted versus wavelength. The locking of the phase difference between transmitted and reflected E-fields occurs due to multiple interference effects within the etalon.

This invention utilizes this feature by interfering the two resulting signals, by way of example, so that a flat spectral passband filter can be realized. By adjusting the phase relationship between the two signals exiting opposing faces of the Fabry-Perôt etalon 110, and subsequently interfering these signals, various desired output responses can be realized. Of course, optionally, additional control can be added to either attenuate or amplify one of or both of the two signals. Since the path length difference between the optical fibres between port 2 of the etalon 110 and the 50/50 splitter 119 and between port 3 of the etalon 110 and the 50/50 splitter will likely be other than zero or some exact multiple of the free spectral range of the etalon, provision of the phase shifter 117 ensures a means of adjusting for unwanted or desired phase differences due to path length differences.

If no inherent phase difference is created between the two arms of the interferometer, that is, between the paths between the etalon 110 and the splitter 119 the following outputs will be obtained.

Output from port 3: $E_R e^{j\theta R} + E_T e^{j(\theta T - \pi/2)}$

Output from port 2: $E_T e^{j\theta T} + E_R e^{j(\theta R - \pi/2)}$

Where $\theta R$ and $\theta T$ are the reflected and transmitted phases created by the etalon. The interferometric output will be given by the general expression:

$I_{Res} = 1/2(E_R^2 + E_T^2 + 2E_R E_T \cos(\Delta\theta))$

Where $\Delta\theta$ represents the phase difference between the two E-fields. If $\theta R = \theta T$ then the phase difference for both outputs will be $\pi/2$. Also if $\theta R - \theta T = \pi$ then again the phase difference for both the outputs would be $\pi/2$. Thus, the interferometric action that is desired does not exist.

However, a $\pi/2$ phase difference is provided in the interferometric arms then the two outputs would be given by:

Output from port 3: $E_R e^{j\theta R} + E_T e^{j(\theta T)}$

Output from port 2: $E_T e^{j(\theta T + \pi/2)} + E_R e^{j(\theta R - \pi/2)}$

As can be seen from above the outputs from the interferometer now have a $\pi$ phase shift, which indicates that useful or a desired interferometric action between the two signals can exist. The phase difference for the output at port 3 and the output at port 2 would be $\theta R - \theta T$ and $\theta R - \theta T - \pi$ respectively. If $\theta R = \theta T$ then the phase difference for output the output at port 3 and 2 would be 0 and $\pi$ respectively. For $\theta R - \theta T = \pi$ then output at port 3 and 2 would have a phase difference of $\pi$ and 0 respectively. Thus channel selection can be realized.

Referring now to FIGS. 4a to 4x? simulation plots of expected outputs responses are shown, wherein the circuit operates as a de-interleaver filter, providing the separation of odd channels at one output of the splitter and even channels at a second output of the splitter.

By changing the phase relationship between the signals in the two arms of the circuit, being fed to the splitter, and by changing the reflectivities of the end faces of the etalon, for example to have 60% and 1% reflectivities, the interleaving function disappears and the circuit operates to provide a linearized output. Such a linearized output signal is useful in such applications as wavelength locking, where a linear ramped signal is desired. Furthermore, if the two output signals are subtracted from one another, the effect is further enhanced since no loss of the signal will be induced.

Turning now to FIGS., 4a through 4c, an optical device is shown in accordance with the invention embodying a free-space device wherein unguided collimated light propagates within the device. The interleaver/de-interleaver shown has two glass interferometric end plates 42 having a spacer disposed therebetween. The spacer region between the two interferometric end plates 42 has a 50/50 coating (shown) except for where a dotted line is shown. This dotted line represents the region between the plates 42 where the etalon is formed (not shown in detail) of two at least partially reflecting surfaces having an air gap there between having a predetermined dimension of >5$\lambda$ defining the free spectral range of the etalon. Graded index (GRIN) lenses 40a, through 40c in FIGS. 4a and 4b serve to provide collimated light through and between the end plates 42, and serve as focusing lenses at output ports. Mirrors 41a and 41b, are disposed at ends of the plates 42 to direct the beam toward a particular port. For example, light launched into an input port at lens 40a is directed at the etalon between the plates. About 50% of the light is transmitted through the front end of the etalon and follows a path wherein the light is incident upon the mirror 41a and it is subsequently directed to the lens 41b; the remaining light is transmitted through the back side of the etalon and impinges upon the mirror 41b where it is subsequently directed to the port at lens 40c. As shown, when channels having centre wavelengths $\lambda 1, \lambda 2, \lambda 3, \lambda 4, \ldots \lambda n$ are launched into the port at lens 40a, the channels are de-interleaved at the ports at lenses 40b and 40c into channel groups $\lambda 1, \lambda 3, \lambda 5$ and $\lambda 2, \lambda 4, \lambda 6 \ldots$ respectively; thereby providing two de-interleaved groups.

Figure 4C:
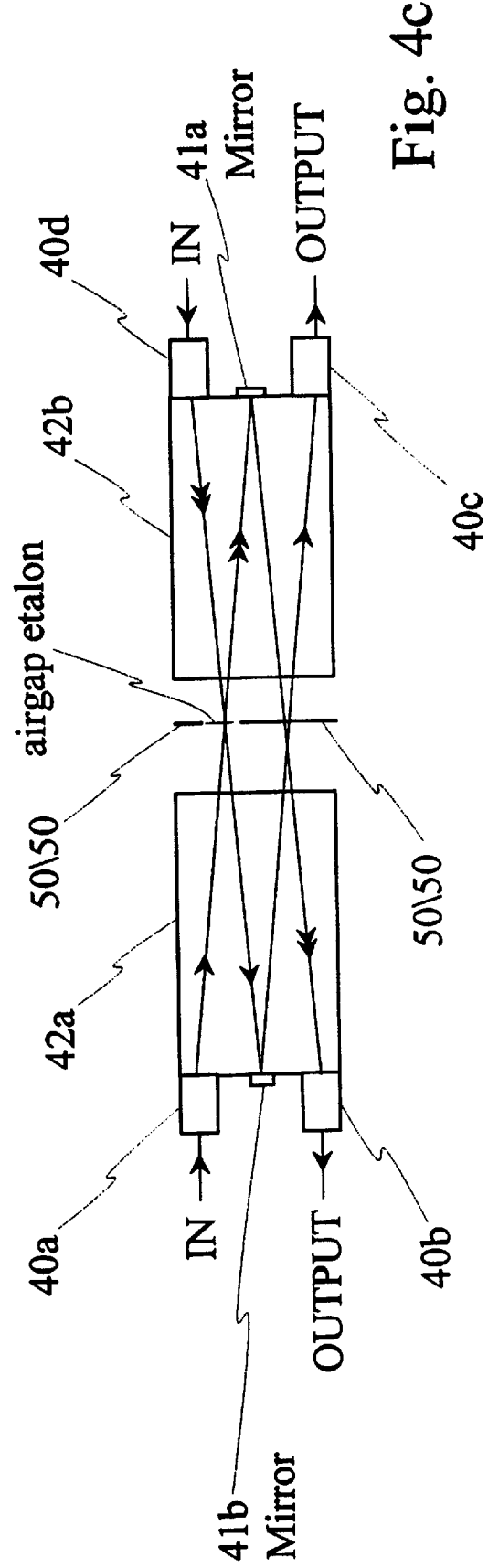
FIG. 4c is a similar circuit block diagram to FIGS. 4a and 4b, wherein a fourth port is added.

FIG. 4b illustrates how the same circuit of FIG. 4a can be used backwards to interleave de-interleaved channels. Furthermore, FIG. 4c illustrates that an extra input port at GRIN lens 40d can be added and the circuit can be used to switch input channels to either output port by appropriately adjusting and controlling the phase.

Figure 5:
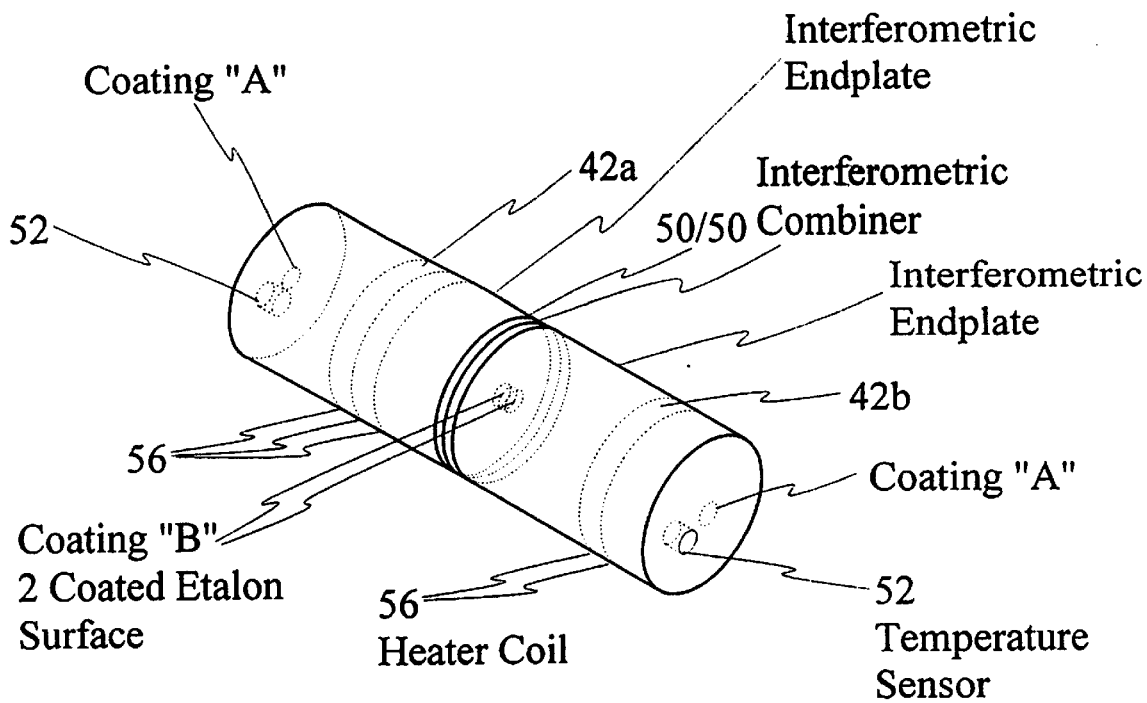
FIG. 5 is a detailed block diagram depicting a preferred embodiment similar to the one shown in FIGS. 4a to 4c.

Referring now to FIG. 5, an optical device is shown in accordance with the invention embodying a free-space device wherein unguided collimated light propagates within the device. The interleaver/de-interleaver shown has two glass interferometric end plates 42 having a spacer disposed therebetween. The end plates and the spacer are joined by optical contacting. These contacting surfaces are polished simultaneously and in the same orientation in order to keep their surfaces parallel within 10 arc seconds when assembled. The axis of the through hole of the interferometric combiner and the axis of the coating B on each of the interferometric endplates are concentric within 0.1 mm. The interferometric combiner is conveniently embodied by a 50/50 coating. The etalon is absent this coating. The collimating/focusing GRIN lenses shown in FIG. 4 are not shown in FIG. 5, for clarity. Temperature sensors 52 are shown at ends of the plates 52 to determine the relative temperature difference between the two interferometric end plates 42. Heaters 42a and 42b which are conveniently wrapped around the end plates 42 are used with the temperature sensors 52 to control the phase relationship between the transmitted and reflected optical signals passing through opposite ends of the etalon.

Figure 6A:
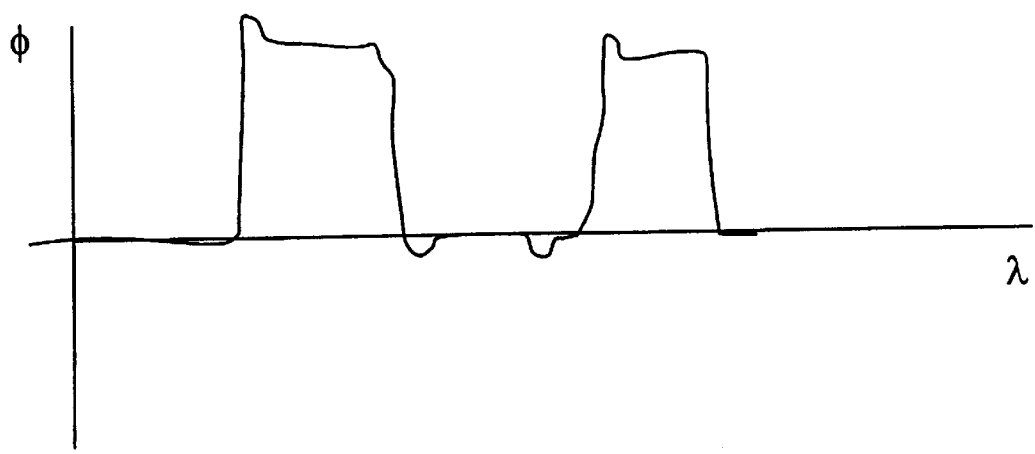
FIG. 6a is a graph of an output response of phase versus wavelength for a multi-cavity etalon shown in FIG. 6c.
Figure 6B:
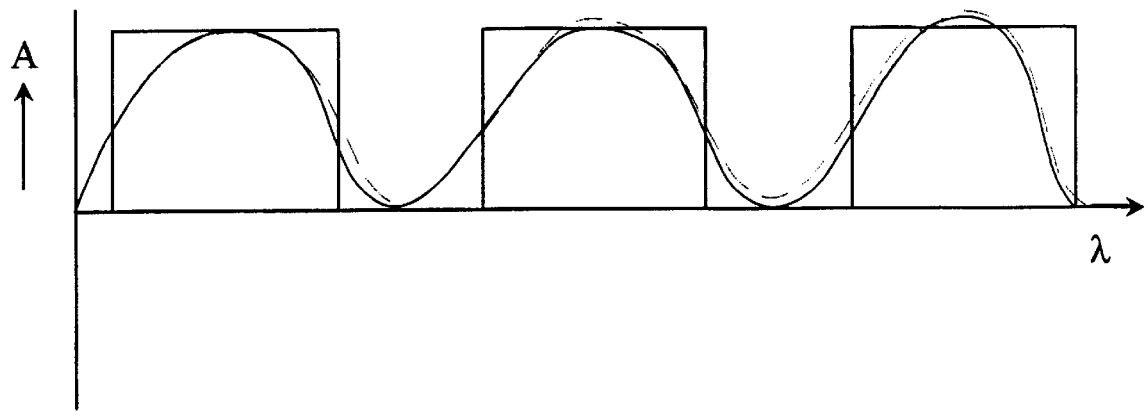
FIG. 6b is a graph depicting the output response of a single cavity etalon and of a multiple cavity etalon.
Figure 6C:
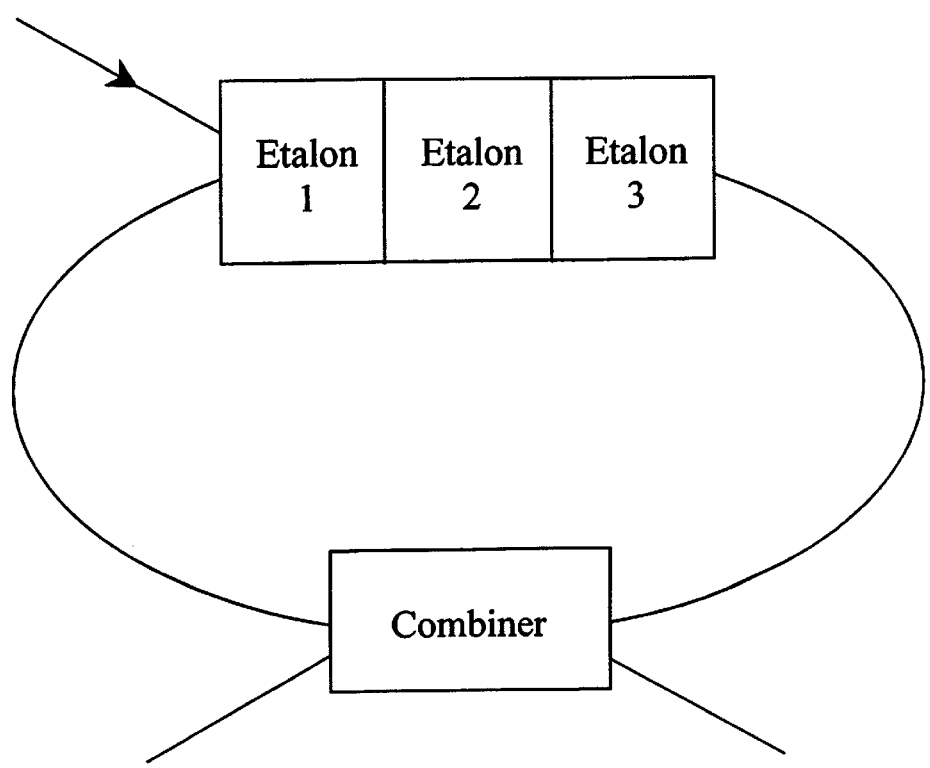
FIG. 6c is a circuit diagram of an alternative embodiment of the invention wherein a multi-cavity etalon is used.

Another embodiment of the invention is shown in FIG. 6, where an odd-integer number multi-cavity etalon is shown used in a same manner as was the single etalon described heretofore. Thus light is captured and combined from outermost opposite ports of the multi-cavity etalon structure in accordance with the teaching of this invention. By using multi-cavities, i.e. three etalons, the profile shown if FIG. 6a is acquired wherein there is an increase in the phase at certain portions 62 of the graph which result in a steeper sharper output response. Furthermore, by providing more etalon surfaces, i.e. at least four reflective surfaces in the instance of a three cavity etalon, more control is afforded by being able to change the reflectivites of each surface. FIG. 6b illustrates two plots, one in dotted outline, which represents a portion of an output spectrum for a single cavity etalon and a solid line which represents the same portion of the output spectrum for a three cavity etalon device, in accordance with the invention. FIG. 6c illustrates the circuit in accordance with this invention having a multi-cavity etalon coupled to a combiner.

Figure 7:
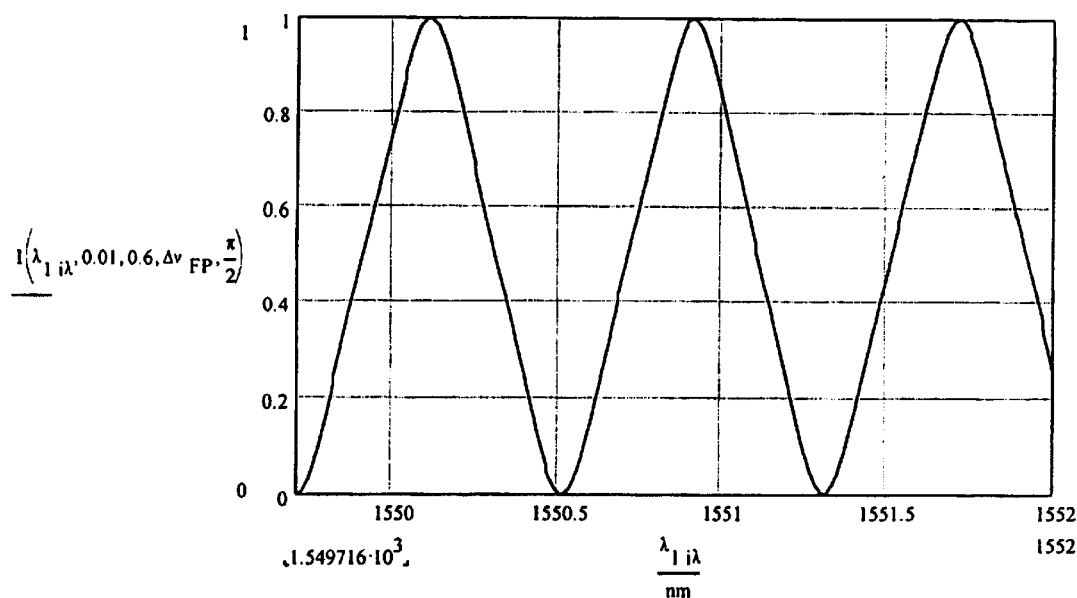
FIG. 7 is a graph depicting a linearized intensity output response of an alternative embodiment of the invention; and, FIG. 8 is a graph depicting a an output response of an alternative embodiment of the invention where the reflectivities and phase are selected such that a band pass filter is provided.

In previous embodiments of the invention the phase shifter has ensured an effective phase difference of $\pi/2$, so that the phase shift incurred through the 50/50 splitter has been compensated. This, then, has allowed complete constructive and destructive interference to occur in the interferometer outputs. However, if a different phase difference is used, then with a certain combination of reflectivities for the two facets of the etalon, a linearized intensity variation with wavelength as shown in the graph of FIG. 7 can be achieved. In this example, the reflection coefficients are 0.01 and 0.6 and the phase difference is 0.

Figure 8:
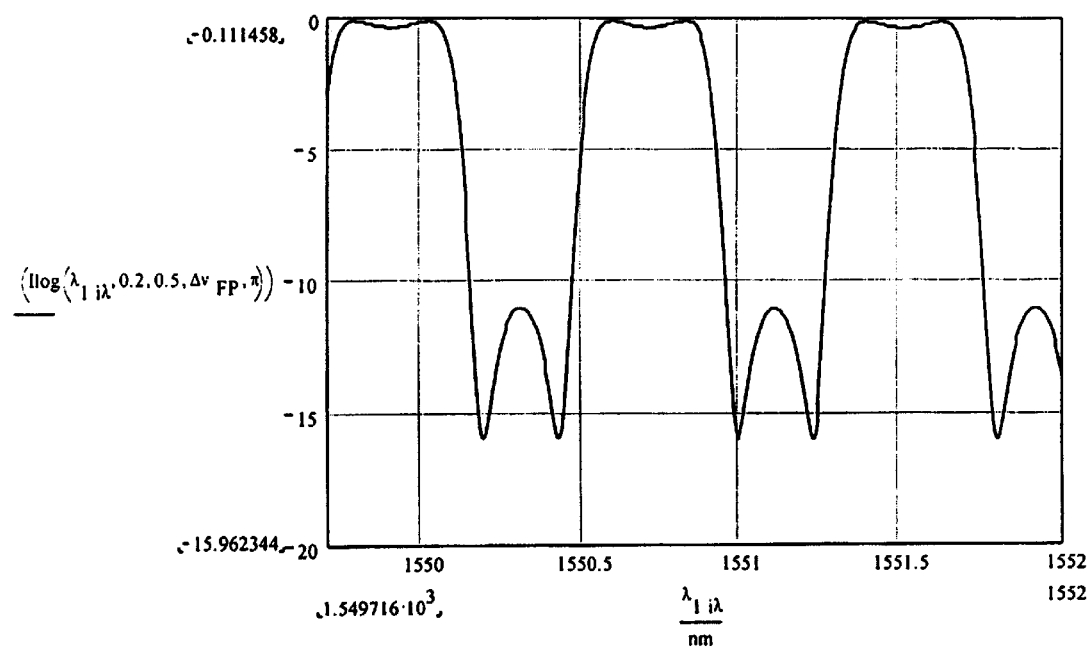

FIG. 8 illustrates and alternative embodiment whereby a flat filter pass band is provided by using the correct phase difference and reflectivities.

Of course numerous other embodiments may be envisaged, without departing from the spirit and scope of the invention. For example, the etalon or multi-cavlity etalon can be a tunable etalon.

What is claimed is:

1. A filtering device comprising:
    a resonant optical cavity having a first and a second partially transmissive reflector, said resonant optical cavity having a first port disposed at the first partially transmissive reflector and a second port disposed at the second partially transmissive reflector; and,
    means for combining light beams, said means being optically coupled with the first and second ports of the resonant optical cavity, said means being capable of combining light beams exiting the first and second port so that they interfere to provide one or more output beams of light.

2. A filtering device as defined in claim 1, wherein the resonant optical cavity has an input port and wherein the first and second ports disposed at the first and second partially transmissive reflectors, respectively, are two output ports.

3. A filtering device as defined in claim 3, wherein the device is capable of filtering an optical signal having a channel having center wavelength of $\lambda_c$ and wherein the first and second partially transmissive reflectors are disposed at least $5\lambda_c$ apart.

4. A filtering device as defined in claim 3, wherein the optical cavity is an etalon, and wherein the first and second partially transmissive reflectors are first and second end faces of the etalon, respectively.

5. A filtering device as defined in claim 4, wherein the optical cavity is a Fabry-Perôt etalon.

6. A filter device as defined in claim 5, wherein the Fabry-Perôt etalon is a low finesse etalon.

7. A filtering device as defined in claim 4, further comprising first and second waveguide arms disposed between the first and second output ports and the means for combining respectively.

8. A filtering device as defined in claim 7, wherein the first and second waveguide arms are optical fibres.

9. A filtering device as defined in claim 8, further comprising a GRIN lens disposed between at least one of the optical fibre ends and at least one of an end face of one of the partially transmissive reflectors, and the phase shifting means.

10. A filtering device as defined in claim 4, including a first waveguide arm coupled between the first output port and the means for combining light beams exiting the first and second output ports, and a second waveguide arm coupled between the second output port and the means for combining light beams exiting the first and second output ports so that they interfere.

11. A filtering device as defined in claim 7 further comprising a phase shifter disposed along at least one of the first and second waveguide arms for varying the phase relationship between two light beams propagating along the first and second waveguide arms.

12. A filtering device as defined in claim 7 further comprising a phase shifter disposed between one of the first and second ports and the means for combining.

13. A filtering device as defined in claim 11, wherein the phase shifter provides a compensation for a phase difference between the two beams.

14. A filtering device as defined in claim 7 wherein the means for combining is a splitter having a predetermined splitting ratio.

15. A filtering device as defined in claim 2, wherein the resonant optical cavity, comprises an odd number of resonant optical cavities, at least one of the optical cavities having a free-spectral range of $5\lambda_c$ wherein the device is capable of filtering an optical signal having a channel having center wavelength of $\lambda_c$.

16. A filtering device comprising:
    a first GRIN lens and a second GRIN lens, the lenses having a substantially collimating end and a substantially focusing end;
    a first light transmitting spacer and a second light transmitting spacer between the substantially collimating ends of the first and second GRIN lenses, the spacers defining combining regions for light beams to combine;
    a beam splitting filter and a resonant optical cavity having a first and a second partially transmissive reflector being disposed between the first and second light transmitting spacers, said resonant optical cavity having a first port disposed at the a first partially transmissive reflector and a second port disposed at the second partially transmissive reflector.

17. A filtering device as defined in claim 16 further comprising temperature sensors disposed about the first and second spacers for determining at least the relative temperature difference between the two light transmissive spacers.

18. A filtering device as defined in claim 17 further comprising a heater or cooler disposed about at least one of the light transmissive spacers, for varying the phase between two optical signals entering the optical cavity or exiting the optical cavity.

19. A method of filtering an input beam comprising multiplexed channels of light each occupying a predetermined wavelength band, at least one of the channels having a centre wavelength of $\lambda_c$, the method comprising the steps of:
   providing the input beam to a resonant optical cavity having a first end face and a second end face spaced a distance apart of at least $5\lambda$;
   interfering a first output beam from the first end face of the resonant optical cavity;
   with a second output beam from the second end face of the resonant optical cavity to produce one or more filtered output beams.

20. A method of filtering as defined in claim 19 further comprising the steps of varying the phase relationship between the first output beam and the second output beam prior to combining the two captured beams.

21. A method as defined in claim 20, wherein the step of varying the phase relationship is performed so as to provide a phase offset of $\pi$ at intervals of transmission spectral peaks between the first and second output beams to provide a de-interleaver filter.

22. A method of providing a linearised intensity variation with wavelength comprising the steps of:
   providing the input beam to a resonant optical cavity;
   capturing a first output beam from a first end face of the resonant optical cavity;
   capturing a second output beam from a second end face of the resonant optical cavity; and,
   combining the two captured beams so that they interfere with one another to produce one or more filtered output beams.

23. A method as defined in claims 22 wherein the resonant cavity is an etalon.

* * * * *